United States Patent Office 3,315,917
Patented Apr. 25, 1967

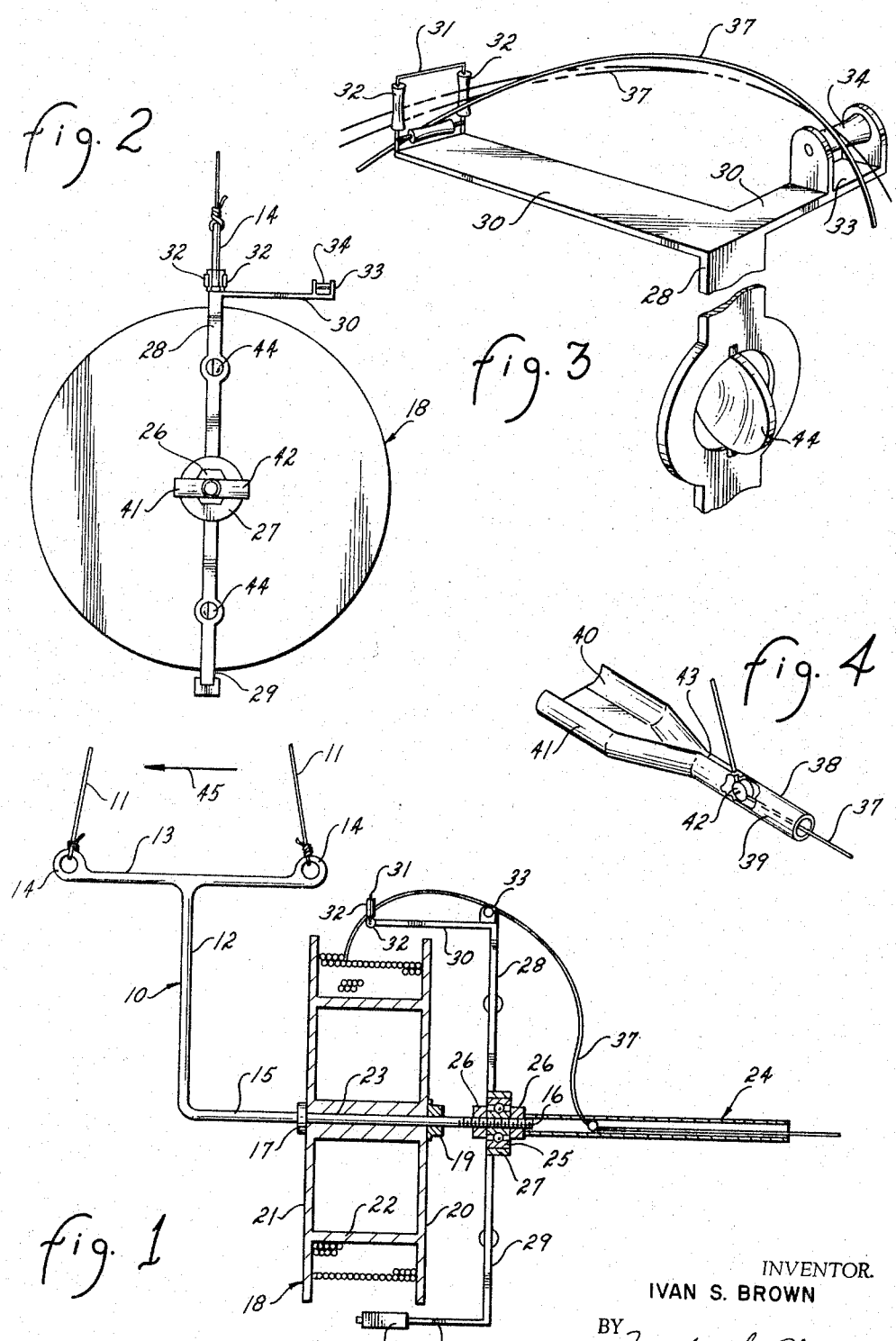

3,315,917
CABLE LAYING DEVICE
Ivan S. Brown, 115 W. Piedmont Ave.,
Phoenix, Ariz. 85041
Filed Aug. 24, 1964, Ser. No. 391,618
6 Claims. (Cl. 242—128)

This invention relates to the laying out of electrical and similar cable. More particularly, it relates to an apparatus by which electrical cable may be laid out, connected from power pole to power pole, or connected from one termination point to another over rough or inaccessible terrain and/or rivers by means of a helicopter or other air vehicle.

In the past, the common method and apparatus employed for laying out cables was to carry the cables, which were rolled on wooden spools, on pack mules and, once having reached the point of origin, unroll them over the prescribed area. This method required many men and involved considerable danger due to the weight of the cable on the spool and the rough terrain. More recently, helicopters have been put into use to unroll the cable. Presently, in using a helicopter, a shaft is placed through the wooden spool, and a rope is looped from one end of the shaft around the spool to the other end on the shaft. The helicopter then hooks onto the rope and carries the spool away while one end of the cable is securely fastened at the starting point. However, due to the reciprocating action of the cable unwinding and lashing back and forth as it unwinds from one end of the spool to the other, and due to the spinning of the heavy, cable-laden spool itself and the gyroscopic effects thereby set up, the helicopter is very difficult to maneuver and dangerously unstable.

According to the present invention, a cable-laying system is provided wherein a minimum number of linemen may efficiently lay out and position the cable with the minimum amount of time and cable damage, even in rough terrain.

Thus, it is a principal object of the present invention to provide a means of laying out cable or similar equipment over inaccessible areas which is easier to work with, safer to use, and has less chance of damaging equipment than those of the prior art.

An additional object of this invention is to provide a more reliable system for allowing cable to be wired directly to pole towers and for doing this job more quickly and safely.

Yet another object of this invention is to provide such an apparatus which will not cause any adverse effect on the maneuverability of the helicopter or other vehicle from which cable is being laid.

Further and additional novel objects and features of this invention will hereinafter be explained and claimed.

Other objects of the invention will become apparent from the following description of a preferred embodiment of the invention when taken in connection with the drawings which accompany and form a part of this specification.

In the drawings:

FIGURE 1 is a cross-sectional elevation view of a preferred embodiment of the apparatus of the present invention.

FIGURE 2 is a front view of the embodiment shown in FIGURE 1.

FIGURE 3 is a partial perspective view of the pickup arm portion of the illustrated embodiment of the present invention.

FIGURE 4 is a partial perspective view of the feeding portion of the illustrated embodiment of the present invention.

Generally speaking, the present invention comprises a device for laying cable from an air vehicle, such as a helicopter, which said device includes a support member, a spool member, and a cable pickup and feeding member. The support member is attached to the vehicle at one end of said support member and the other end of said support member includes an axle portion. The spool member, carrying cable wound thereon in a normal fashion, is fixedly mounted on said axle portion with said axle portion disposed along the center line of said spool member. The cable pickup and feeding member is rotatably mounted on said axle portion adjacent the spool member and includes an arm member whose end portion is disposed adjacent the outside diameter of the spool member. This arm member is adapted, as by means of guide rollers, to guide cable from the spool member to a feeding portion of said cable pickup and feeding member disposed in line with said axle portion. Thus, when cable is pulled or fed linearly out of the present invention by way of said feeding portion, the unwinding of cable off the fixed spool member is readily accomplished, since the cable pickup and feeding member, which guides the cable, may freely rotate to continuously guide the cable as it is being unwound.

Referring now particularly to the accompanying drawings, a preferred embodiment of the present invention will now be described with reference to FIGURES 1 and 2. A support member 10 is attached by means of rope arrangement 11 to the desired vehicle (not shown). Arm 12 of support member 10 is connected to a cross member portion 13 which has situated at each end thereof a rope loop 14. Each end of rope arrangement 11 is secured to a respective rope loop 14.

Support member 10 also includes an axle portion 15, perpendicularly disposed to arm 12. Axle portion 15 terminates at a threaded portion 16 and includes thereon flange 17. A spool 18 adapted to carry cable wound thereon is fixedly mounted on axle portion 15 by firmly compressing it between flange 17 and clamp 19.

Spool 18, as shown, includes two side members 20 and 21 of like thickness and diameter and enclosing a center member 22 of greater thickness and smaller diameter. Through the center of spool 18 is a hole 23 whose diameter is larger than that of axle portion 15, including the threaded portion 16 thereof.

Cable pickup and feeding device 24 is rotatably mounted on the threaded portion 16 of axle portion 15 of support member 10 by means of a bearing 25. Bearing 25 is mounted on threaded portion 16 between two shoulder nuts 26.

Housing 27, attached to the outer periphery of bearing 25, has attached thereto and extending oppositely and radially therefrom, arms 28 and 29. Extending from arm 28 is arm 30 which is terminated at its end nearest spool 18 by a box-like roller housing 31 that contains three guide rollers 32. At the end of arm 30 furthest from spool 18 is a roller housing 33 which holds rollers 34. Perpendicular to and part of the arm 29 is arm 35. Attached to arm 35 is a weight 36 for balancing cable pickup and feeding device 24.

FIGURE 3 illustrates in detail the roller housing 31 and guide rollers 32 at one end of arm 30 and the roller housing 33 and roller 34 at the other end of arm 30. Also illustrated, by broken lines, are some of the positions the cable 37 may assume when being guided by the rollers on arm 30.

Feeding member 38, illustrated in detail by FIGURE 4, is secured to bearing housing 27 and situated in line with axle portion 15. Feeding member 38 includes guide tube 39 having split sides 40 and 41 at one end thereof. A roller 42 is mounted in guide tube 39 as shown and a slot 43 in guide tube 39 extends from directly above roller 42 to the split sides 40 and 41. Feeding member 38 is secured to bearing housing 27 by attachment of split sides 40 and 41 to housing 27. Positionwise, this attachment is made so that the cable 37 coming from roller 34 passes through slot 43, under the roller 42, and out through the guide tube 39.

Adjustable air brakes 44 may be attached to arms 28 and 29 as shown to provide a braking action to the free rotation of cable pickup and feeding device 24 in order to help control unwanted cable feed out due to the weight of the cable and in order to help provide some tension in the cable being fed out. Sufficient tension in the cable becomes extremely important, for example, when laying cable across deep gorges. Adjustable air brakes 44 may obviously be adjusted by turning them to adjust the position of the cup members thereof. Although the braking mechanism herein shown and described is preferred, it will be apparent to those skilled in the art that many other braking mechanisms may be designed to fulfill the purposes and objects herein mentioned.

The method and manner in which the illustrated apparatus of the present invention is used will now be described with reference to the accompanying drawings. Spool 18, wound with cable 37, is placed on axle portion 15 against flange 17 by passing hole 23 onto axle portion 15 at threaded portion 16 and fixing clamp 19. Cable pickup and feeding device 24 is then assembled on threaded portion 16 as shown in FIGURES 1 and 2. The helicopter or other air vehicle picks up the described apparatus of the present invention by picking up the rope arrangement 11 so that the described apparatus hangs with guide tube 39 rearmost. The cable 37 has been previously threaded through the cable pickup and feeding device 24, as shown in FIGURE 1. The arrow 45 at the top of FIGURE 1 shows the direction in which the helicopter or other vehicle will proceed as the cable is being layed. The end of cable 37 coming out of the guide tube 39 is then tied securely to a pole tower or some other fixed point on the ground (not shown), and the helicoptor flies in the direction in which the cable is to be layed. Thus, the cable 37 is pulled or fed linearly out the guide tube 39, and the continuing supply of cable by the unwinding of cable 37 off of spool 18 is readily accomplished, since the cable pickup and feeding device 24, which guides cable 37, may freely rotate to continuously guide cable 37 as it is being unwound.

It is noted that the cable pickup and feeding device of the present invention may obviously be made very light as compared to the spool holding the cable. Thus, the dangerous gyroscopic effects which existed in the prior art are eliminated by the present invention since in the present invention the spool is not allowed to rotate. In addition, as herein shown, the apparatus of the present invention feeds cable in a smooth linear fashion and the hazardous lashing of the cable back and forth from one end of the spool to the other as found in older systems wherein the cable was unwound and fed directly off the spool, is thereby eliminated.

Thus, it is readily seen that helicopter pilots and linemen using the apparatus of the present invention would have far greater control of the aircraft and the positioning of the cable than those using prior art systems. The work of laying cable may proceed much faster with greater safety and less chance of damage to equipment or crew.

It is noted that the purpose of the specific location of roller housing 33 and roller 34 in the illustrated embodiment is to provide support for the smooth, natural loops the cable naturally makes as it is pulled through the cable pickup and feeding device 24 following the natural kinks of the cable.

It is further noted that the term "cable" as used herein and in the appended claims is not restricted to include only typical electrical cable, but, in accordance with the wide range of uses to which the present invention may be put, includes all manners of cables, ropes, lines, wires, etc. with which the present invention may be advantageously used.

Also, it will be apparent to those skilled in the art, from the teachings herein, that the apparatus of the present invention may be put to advantageous use, if desired, to wind or rewind cable, as onto spool 18, by motorizing the cable pickup and feeding device (e.g. device 24) to rotate and pull cable from a source outside the feeding member (e.g. feeding member 38), whereby the cable is pulled and guided in a direction opposite to that in the described embodiment. Camming of cable pickup and feeding device 24 to reciprocate along axle portion 15 as device 24 is rotated by a motor, for example, would effect a typical and neat rewinding of cable onto spool 18.

It is to be understood that the above teachings are illustrative in nature. Many modifications, alternatives, and variations of the present invention will be apparent to those skilled in the art from the teachings herein and it is intended that all such modifications, alternatives, and variations fall within the scope of the present invention limited only by the appended claims.

What is claimed is:

1. A device for laying cable from a moving air vehicle comprising: A support member adapted to be carried by tension means beneath said vehicle, said support member including an axle portion; fixedly mounted on said axle portion, a spool member adapted to carry cable wound thereon; rotatably mounted on said axle portion, a cable pickup member adapted to rotate around the peripheral diameter of said spool member and pick up and guide cable therefrom; and a feeding member for mechanically guiding cable from said cable pickup member and feeding said cable linearly in line with said axle portion.

2. The device of claim 1 wherein the cable pickup member comprises a U-shaped structure having a bearing at its center portion, a cable guide member at one end thereof, and a counterbalancing weight at the other end thereof.

3. A device for laying cable from an air vehicle, comprising: A support member including an axle portion, said support member being adapted to be carried by tension means beneath said vehicle; fixedly and symmetrically mounted on said axle portion, a spool member adapted to carry cable wound thereon; rotatably mounted on said axle portion adjacent said spool member, a cable pickup and feeding member including a guide member disposed adjacent the peripheral diameter of said spool member and a feeding portion disposed in line with said axle portion; said cable pickup and feeding member being adapted to guide cable from said spool member to said guide member to said feeding portion.

4. The device of claim 3 wherein said feeding portion includes a hollow cylindrical guide tube.

5. The device of claim 3 wherein said guide member includes at least one guide roller.

6. A device for laying cable from an air vehicle, comprising: A support member including an attachment portion adapted to be attached to said vehicle by tension means and an axle portion disposed perpendicularly to said attachment portion; a spool member, adapted to carry cable wound thereon, fixedly mounted on said axle portion, said axle portion being disposed along the center line of said spool member; and a cable pickup and feeding member rotatably mounted on said axle portion adjacent said spool member, said cable pickup and feeding member including an arm member whose end portion is disposed adjacent the peripheral diameter of said spool member and centrally disposed with respect to the width of said spool member, said arm member including guide rollers disposed thereon, and said cable pickup and feeding member including a feeding portion comprising a guide tube disposed in line with said axle portion; said arm member being adapted, by means of said guide rollers disposed thereon, to guide cable from said spool member to said feeding portion.

References Cited by the Examiner
UNITED STATES PATENTS

| | | | |
|---|---|---|---|
| 2,602,606 | 7/1952 | Hanse | 242—128 |
| 2,950,876 | 8/1960 | McLoughlin | 242—128 |
| 3,243,141 | 3/1966 | Cook et al. | 242—129 |

FRANK J. COHEN, *Primary Examiner.*

LEONARD D. CHRISTIAN, *Examiner.*